INVENTOR
R. A. KAENEL
BY
William H. Kamstra
ATTORNEY

MAGNETIC ENCODING CIRCUITS

Filed Dec. 18, 1959 3 Sheets-Sheet 2

INVENTOR
R.A. KAENEL
BY
William H. Kamstra
ATTORNEY

March 31, 1964 R. A. KAENEL 3,127,600

MAGNETIC ENCODING CIRCUITS

Filed Dec. 18, 1959 3 Sheets-Sheet 3

INVENTOR
R. A. KAENEL
BY
William H. Kamstra
ATTORNEY

United States Patent Office 3,127,600

Patented Mar. 31, 1964

3,127,600

MAGNETIC ENCODING CIRCUITS

Reginald A. Kaenel, Murray Hill, N.J., assignor to Bell Telephone Laboratories, Incorporated, New York, N.Y., a corporation of New York Filed Dec. 18, 1959, Ser. No. 860,438

11 Claims. (Cl. 340—347)

This invention relates to electrical circuits employing magnetic switching elements, in particular to such circuits adapted to convert complex electrical wave forms to coded groups of discrete electrical signals.

Electrical circuits capable of converting complex wave forms such as a sinusoidal carrier modulated in accordance with intelligence bearing waves of a lower frequency, such as human voice currents, for example, are well known. When such complex waves are converted to coded groups of discrete electrical signals, a coded group which is representative of the amplitude of the complex wave at a given instant, the resulting output signals are frequently termed as being pulse coded modulated. In this manner signals which constitute an analog of the intelligence or information represented at any given instant and which signals may vary at any instant over a wide amplitude range, are converted to signals which represent the same information in the form of coded groups of discrete signals each having the same amplitude and occurring at predetermined time intervals. The latter information bearing signals, particularly when grouped in a binary code, are handled with greater facility and, equally importantly, with greater speed, in information handling and data processing systems generally.

Prior art arrangements which employ cathode ray tubes for accomplishing the code conversion operation are well known. Thus, for example, a conversion circuit in which an electron beam is utilized to select a particular code grouping representative of an instantaneous amplitude of a complex wave being converted, is described by W. M. Goodall in Patent No. 2,616,060, issued February 20, 1952. The electron beam is deflected by variations in the complex input wave to search out the particular code group representative of the amplitude of the input wave at the instant it is being examined by the conversion circuit. Such a circuit, although advantageously performing its coding and conversion function, does so with all of the considerations attending the use of electron emission devices generally. Thus, from the viewpoint of reliability, simplicity, power requirements, cost and time of fabrication, and the like, an even more advantageous conversion circuit would represent an advance in the art.

The advent of magnetic switching elements exhibiting substantially rectangular hysteresis characteristics has made possible the realization of the foregoing advantages in a conversion circuit according to the principles of the present invention. It is thus an object of this invention to provide a new and improved analog-to-pulse code conversion circuit employing magnetic switching elements.

It is another object of this invention to advance the reliability and simplicity of code conversion circuits and achieve a more compact circuit assembly.

Another object of this invention is to accomplish the conversion of complex wave forms analogous of particular information into discrete electrical signals representative of the particular information in coded pulse form.

Still a further object of this invention is to provide a new and novel electrical information conversion circuit.

The foregoing and other objects of this invention are realized in one illustrative embodiment thereof which comprises a plurality of magnetic switching elements exhibiting substantially rectangular hysteresis characteristics. Although magnetic elements of numerous geometries and configurations are adaptable for use in connection with the practice of this invention, conventional magnetic cores of the toroidal type are contemplated in the specific embodiment being generally described. Each of the cores has inductively coupled thereto a plurality of windings including an input winding, a bias winding, a readout winding, and an output winding. The input, bias, and readout windings of the cores are each serially connected in input, bias, and readout circuits, respectively. The output windings of the cores are connected in predetermined combinations to a plurality of coding circuits by means of which the ultimate coding operation is realized. A continuous biasing current applied to the bias lead drives each of the cores to a different quiescent point on its hysteresis characteristic curve by differently adjusting the number of turns of and the sense of the biasing winding in each case. As a result, some of the cores are negatively biased to particular points on the hysteresis curves and others of the cores are positively biased to other points on the hysteresis curve.

An input complex wave form, which may comprise a voice modulated sinusoidal carrier, is applied to the input circuit and thereby to the input windings of the cores, all of which windings have the same number of turns. Since each core is differently biased on its hysteresis curve, each core will respond differently to a particular amplitude of the input wave form. Thus, where one core may be caused to switch from one remanent point on its hysteresis curve to the other as the result of the amplitude of the input wave form at a given time, the remaining cores may respond by various and different excursions on their particularly biased hysteresis curves. Accordingly, each may advantageously be assigned a particular amplitude range of the input complex wave form. A periodic readout pulse applied to the readous circuit and hence to the equal-turn readout windings drives each core a predetermined extent in one direction and return to cause various and different flux excursions in the cores. In only one of the cores a flux excursion occurs from one condition of saturation to the other as the result of either the leading or trailing edge of the readout pulse. Output signals generated responsive to flux excursions in the cores during readout in the equal-turn output windings are transmitted to the coding circuits in particular combinations in accordance with the code to which conversion is to be accomplished. Since each core was subjected to a different flux excursion as the result of its particular bias and the instantaneous amplitude of the input wave form, during a particular readout each core generates an output signal corresponding to its particular flux excursion. Output signals of different amplitudes thus appearing simultaneously on the coding circuits are readily discriminated on an amplitude basis by suitable discriminator circuits well known in the art. A final coded group of output signals is thus positively representative of the amplitude of the input complex wave form at substantially the moment of readout just as the same amplitude is an analog of a part of the input information at that moment. The readout pulse in effect thus comprises a means for scanning the input wave form being converted.

It is thus one feature of this invention that a plurality of magnetic cores of substantially rectangular hysteresis loop type are each differently biased on their loops. The instantaneous amplitude of a complex input wave form, simultaneously applied to an input winding on each of the cores, as a result, causes a different flux excursion on the hysteresis loop of each of the cores. In a readout phase during which each of the cores are similarly driven, output signals of different amplitudes generated in output windings of the cores are by their particular amplitudes precisely representative of the amplitude of the complex input wave form at a given instant.

According to another aspect of this invention, it is a feature thereof that a coded output circuit network is provided such that a particular one of the foregoing output signals of different amplitudes is selected to generate a coded group of signals in turn representative of the amplitude of the complex input wave form at the given instant.

It is another feature of this invention that a pair of output windings are coupled to each of the cores of a conversion circuit in which output signals of opposite polarity are induced during a readout operation. The signals from a first of the windings is employed to bias a biasing bus to which bus the second output winding is also connected. By suitably adjusting the number of turns of the two windings a threshold may be established below or above which output signals induced in the second output winding are suppressed.

According to still another feature of this invention an auxiliary core is provided for each of the cores of the conversion circuit generally described in the foregoing. Each of the auxiliary cores is magnetically driven in the same manner and to the same extent as its companion main core with the exception of the readout drive. Output windings are coupled to the cores of each pair in the same number of turns but in opposite sense and are connected in series. As a result, a flux excursion in the main core induces an output signal in the output winding of the main core and this signal is transmitted to the coding network in the normal manner. However, should unwanted flux excursions occur in each core of a core pair as the result of sudden peaks in the input complex wave form, output signals induced in each of the coupled output windings will be effectively cancelled.

The foregoing and other objects and features may be better understood from a consideration of the detailed descriptions of illustrative embodiments of this invention which follow when taken in conjunction with the accompanying drawing in which.

Figure 1:
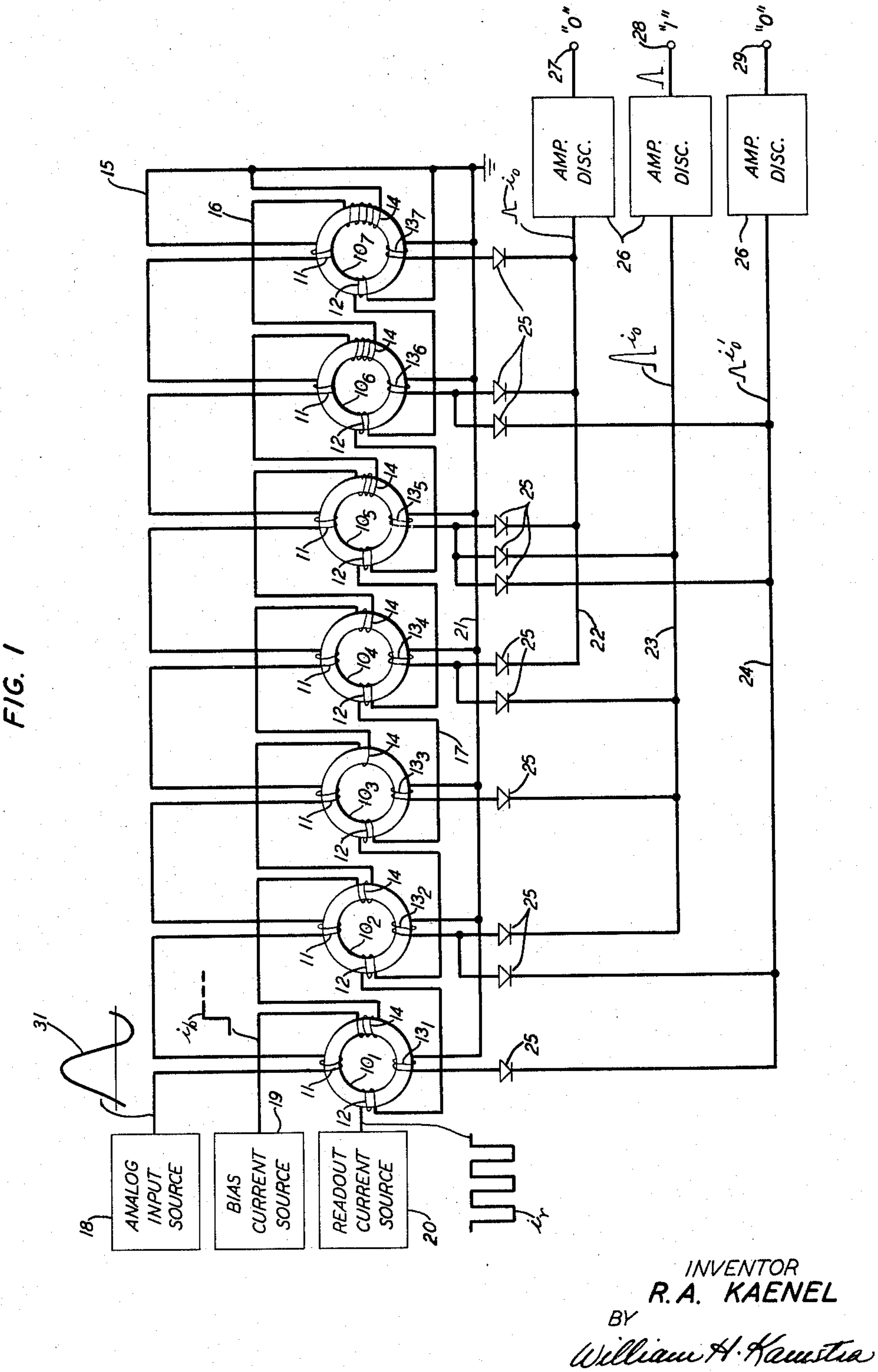
FIG. 1 is a schematic presentation of one specific illustrative conversion circuit according to the principles of this invention.

One specific illustrative conversion circuit according to the principles of this invention is shown in FIG. 1 and comprises a plurality of magnetic cores $10_1$ through $10_7$. Each of the cores 10 is formed of a magnetic material well known in the art which exhibits substantially rectangular hysteresis characteristics. The cores 10 are depicted as being of a conventional toroidal geometry; however, it is to be understood that cores of other forms capable of performing a flux switching function may be employed with equal facility in the practice of this invention. Each of the cores 10 has inductively coupled thereto an input winding 11, a readout winding 12, an output winding 13, and a bias winding 14. The input windings 11 of the cores 10 are serially connected together in an input circuit 15, the bias windings 14 are serially connected together in a bias circuit 16, and the readout windings 12 are serially connected together in a readout circuit 17. Each of the circuits 15, 16, and 17 is connected at one end to ground and at the other end to a specific current source. The input circuit 15 is connected at its other end to an analog input source 18 which source provides the complex analog current wave form which is to be converted to a coded form. The bias circuit 16 is connected at its other end to a bias current source 19 which source provides a continuous biasing current of a magnitude and polarity to be described hereinafter. The readout circuit 17 is connected at its other end to a readout current source 20 which source provides timed current pulses of a polarity also more particularly considered hereinafter. Current sources of the character contemplated as comprising the sources 18, 19, and 20 are well known and are readily envisioned by one skilled in the art. Accordingly, these sources need not be described in detail at this point.

Each of the output windings 13 is connected at one end to a ground bus 21 and at its other end to a particular conductor or conductors of an output coding network. The latter network comprises the conductors 22, 23, and 24 to which the output windings $13_1$ through $13_7$ are connected at their other ends in various combinations through diode means as follows. The output winding $13_1$ is connected through a diode 25 only to the conductor 24, the output winding $13_2$ is connected through diodes 25 to each of the conductors 23 and 24, the output winding $13_3$ is connected through a diode 25 only to the conductor 23, and the output winding $13_4$ is connected through diodes 25 to each of the conductors 22 and 23. The output winding $13_5$ is connected through diodes 25 to each of the conductors 22, 23, and 24, the output winding $13_6$ is connected through diodes 25 to each of the conductors 22 and 24, and the output winding $13_7$ is connected through a diode 25 only to the conductor 22. Each of the conductors 22, 23, and 24 terminates in an amplitude discrimination circuit 26 which latter circuits provide output terminals 27, 28, and 29, respectively. The discrimination circuits 26 may also comprise circuits well known in the art which are capable of responding to input signals of a predetermined amplitude. The diodes 25 may comprise conventional unidirectional current elements of any well-known type.

With the foregoing organization of one illustrative conversion circuit according to this invention in mind, a representative operation thereof may now be described. Such an operation may be better understood with reference to the hysteresis loop-current drive diagram of FIG. 2. A single hysteresis loop 30 is there shown in idealized form and for purposes of description is assumed to depict standardized hysteresis characteristics for each of the cores $10_1$ through $10_7$ of FIG. 1. Each of the latter cores is continuously magnetically biased to a specific point on its hysteresis loop by a bias current $i_b$ supplied from the source 19 to accomplish the first step in the coding operation by means of its bias winding 14. The latter windings are wound on the cores 10 in a sense and with a predetermined number of turns to insure different magnetic operating points with respect to the individual hysteresis loops of the cores. These points are marked off on the H axis of the loop 30 of FIG. 2 as the points $C_1$ through $C_7$ for the cores $10_1$ through $10_7$, respectively. From an inspection of the diagram of FIG. 2 it may be seen that cores $10_1$ and $10_2$ are negatively magnetically biased with respect to the H axis of the BH hysteresis loop 30 and that the cores $10_3$ through $10_7$ are positively so biased. Further, it may be noted that no core is unbiased and that the core $10_4$ is biased to a point of zero magnetization on the positive portion of the loop 30. The sense of the bias windings 14 are shown in FIG. 1 as being consistent with the illustrative operation of this invention being described, assuming a positive direct bias current $i_b$ being applied from the bias current source 19. The number of turns of the latter windings are shown as being different in each core only to emphasize the difference in magnetic bias being applied without intending to demonstrate an actual winding arrangement. Each of the cores 10 is thus magnetically biased to its assigned operating point by either positive or negative magnetizing forces $H_b$ as determined by the sense and the number of turns of the bias windings 14 in each case. The conversion circuit of FIG. 1 is now prepared for the introduction therein of an analog signal via the input circuit 15.

Figure 2:
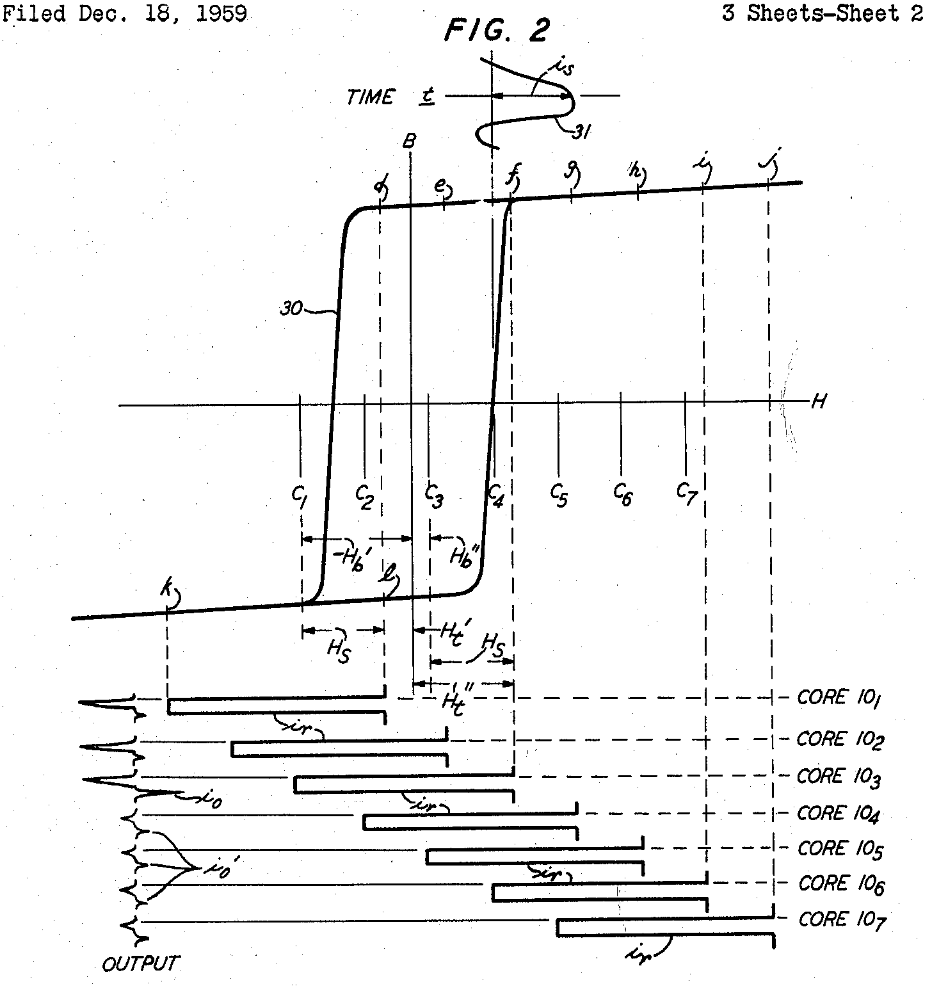
FIG. 2 is a comparison chart showing an idealized hysteresis loop standardized for purposes of description and having projected thereon various biasing and energizing drives at different operative stages of the circuit of FIG. 1.

For purposes of description, an analog current signal 31 having an arbitrary wave form as shown in FIGS. 1 and 2 may be assumed as being applied from the source 18 during the period of the present circuit operation. The current signal 31 is thus also exerting at any given instant by means of the input windings 11, another magnetizing force $H_s$ to each of the cores 10. The sense of the windings 11 and the number of turns is the same for each of the coupled cores, accordingly at any given instant and given signal value $i_s$, the magnetizing force $H_s$ thus supplied will be the same for each core 10. The total magnetizing force applied to a particular core during an operation of the circuit thus far described is thus manifestly $H_b+H_s$. The given signal value $i_s$ may be assumed as taken at a time $t$. At the latter time the total magnetizing force being exerted on the core 10$_1$, for example, is thus $$H_t'=H_s-H_b'$$

This is graphically depicted in FIG. 2 where the magnetizing force $H_b'$ is shown as being negative consistent with the sense of the winding 14 of the core 10$_1$. In a similar manner the total magnetizing force $H_t''$ operative on the core 10$_3$, at the time $t$, for example, may be determined as the sum of its bias $H_b''$ and the signal force $H_s$ acting on the core 10$_3$ at that instant.

With the biasing and input magnetizing forces $H_b$ and $H_s$ thus operative on the cores 10 an illustrative scanning operation of the circuit of FIG. 1 may now be described. The analog signal 31 is scanned by periodically applied negative readout current pulses supplied from the source 20 to the readout circuit 17. The effect of one such readout pulse $i_r$ occurring at the foregoing time $t$ on each of the cores 10 will be considered. To facilitate the description of the operation of the circuit of FIG. 1 the sum $H_t$ of the magnetizing forces $H_b$ and $H_s$ being applied to the cores 10 as described in the foregoing is assumed to drive each of the cores 10$_1$ through 10$_7$ to the points *d, e, f, g, h, i,* and *j*, respectively, on the loop 30. Each of these points represents the total magnetizing force $H_t$ being exerted on the associated core 10 at the instant of readout $t$. Accordingly, the readout pulse $i_r$ is applied to each core 10 with respect to a different magnetic operating point on the H axis. The displacement of the readout pulse $i_r$ and therefore its resulting magnetizing force $H_r$ with respect to each of the cores 10 is shown as a staggered arrangement of the same pulse in FIG. 2. Thus, with respect to the core 10$_1$, for example, the readout pulse $i_r$ is referenced from the point *d* on the loop 30, with each of the succeeding cores 10$_2$ through 10$_7$ having the readout pulse $i_r$ applied, respectively, at the points *e* through *j*.

It is apparent from an inspection of the diagram of FIG. 2, that the same readout pulse $i_r$ will cause a different flux excursion in each of the cores 10. Thus the negative going leading edge of the readout pulse $i_r$ will cause a flux excursion from the point *d* on the loop 30 to the point *k*. As a result, the core 10$_1$ will be switched from positive to negative saturation thereby inducing a large negative output voltage in the coupled output winding 13$_1$. The positive going trailing edge of the pulse $i_r$ being applied to the core 10$_1$ causes a flux excursion in the opposite direction on the loop 30 from the point *k* to the point *l* thereon. However, at this time, as may be determined from the flatness of the loop 30 between the points *k* and *l*, the total flux reversal is negligible and accordingly only a negligible positive signal is generated in the output winding 13$_1$. The large negative and small positive output signals are shown graphically on the horizontal projection of the readout pulse $i_r$ of the core 10$_1$ in FIG. 2. By projecting the reference points of the readout pulses $i_r$ and the resulting traversals on the loop 30 the total flux reversals caused as a result may similarly be demonstrated and are graphically depicted in FIG. 2. It may be noted that at the readout time $t$, the cores 10$_1$, 10$_2$, and 10$_3$ each pass from a condition of positive saturation to a condition of negative saturation as a result of the negative leading edge of the readout pulse $i_r$. The core 10$_3$ however alone is biased at this time so that the positive going trailing edge of the readout pulse $i_r$ can cause a complete excursion in each direction from the point *f* on the loop 30 and return. Accordingly a large output signal is generated in the output winding 13$_3$ in each direction. The remaining cores 10$_4$ through 10$_7$ are each biased so that the readout pulse $i_r$ causes only flux excursions along the upper flat portion of the loop 30 with only negligible net flux excursions resulting. Only negligible output signals in each direction are thus induced in the output windings 13$_4$ through 13$_7$ at the time $t$ being considered. Accordingly, the core 10$_3$ is the only core of the circuit which responds to the input current signal amplitude $i_s$ at the time $t$ by producing a large positive output signal $i_o$ as compared to the negligible positive signals $i_o'$ produced by the remaining cores.

Each of the output signals of differing amplitudes is applied across the one or more of the diodes 25. The latter elements are so poled however that only the positive signals $i_o$ and $i_o'$ are passed to the coding conductors 22, 23, and 24. Accordingly, since the output winding 13$_3$ is connected only to the conductor 23, the large positive signal $i_o$ is transmitted only to that conductor. The remaining conductors 22 and 24 have only the negligible signals $i_o'$ applied thereto. The signals $i_o$ and $i_o'$ are carried via the conductors 22, 23, and 24 to the amplitude discriminator circuits 26. The latter circuits are so adjusted in operation range that only the signal $i_o$ is passed to an output terminal. Accordingly, the amplitude discriminator circuit 26 connected to the conductor 23 during the present readout operation generates an output signal which is made available at its output terminal 28. The output terminals 27 and 29 will thus have no output signals appearing thereon during the present readout operation. The combinations of signals thus appearing on the output terminals 27, 28, and 29 during the illustrative readout operation being described may thus be held representative of the binary coding 0, 1, 0. The latter binary coding is further positively representative of the amplitude range of the sampled input current $i_s$ during the readout time $t$. In recapitulation it may be seen that only one of the cores 10$_1$ through 10$_3$ produced a large positive going output signal for the amplitude range $i_s$ of the input signal 31 at the time $t$.

During succeeding readout times $t_m$, $t_n$, a readout pulse $i_r$ will drive the cores 10 in a manner similar to that described in the foregoing for the time $t$. Should the amplitude of the input signal 31 remain unchanged, that is, remain $i_s$, the operation will be identical to that described in the foregoing. Obviously when the signal amplitude changes the total bias $H_t$ applied to any core 10 also changes with the result that a different core will be caused to undergo a complete flux excursion and return. Although a number of the cores 10 may undergo a complete flux reversal in one direction as evidenced by the excursions of the cores 10$_1$, 10$_2$, and 10$_3$ in the foregoing illustrative operation, only one of the cores at any readout time will be caused to traverse its flux loop and return to generate a large positive output signal. Manifestly other cores may pass through partial flux excursions to generate output signals of intermediate magnitudes at particular amplitude ranges. However, the amplitude discrimination circuits 26 are so adjusted that only an output signal $i_o$ produced by the core 10 having the greatest flux excursion during a readout will be passed to the terminals 27, 28, and 29.

Clearly, from an inspection of the diagram of FIG. 2, it may be determined that the amplitude of an input signal may be such in either direction that the scanning range of the illustrative circuit of FIG. 1 is exceeded. That is, the total magnetizing force $H_t$ may be such that the flux excursions of all of the cores 10 occur only on the flat portions of loop 30. No signals $i_0$ will be generated as a result and no output signals will appear on the output terminals 27, 28, and 29. The binary coding in this case follows as 0, 0, 0. A binary coding representative specifically of a maximum flux excursion in each of the cores 10 and therefore of a particular amplitude range of the analog input signal 31 for the illustrative conversion circuit of FIG. 1 may thus be given by the following table:

| Core: | Binary code |
|---|---|
| No core | 000 |
| $10_1$ | 001 |
| $10_2$ | 011 |
| $10_3$ | 010 |
| $10_4$ | 110 |
| $10_5$ | 111 |
| $10_6$ | 101 |
| $10_7$ | 100 |

In connection with the description of the organization and operation of one illustrative conversion circuit according to this invention, particular polarities of operating signals and senses of windings have been assumed. Obviously these may be adjusted and arranged to suit the particular context in which the circuit is to be operated. In addition the magnitude of the bias current, and hence the degree of magnetic bias $H_b$ applied to each of the cores 10 together with the magnitude of the readout drive, is adjusted in accordance with the particular properties of the core material employed for the cores 10 as manifested in the configuration of the actual hysteresis loops.

Figure 3:
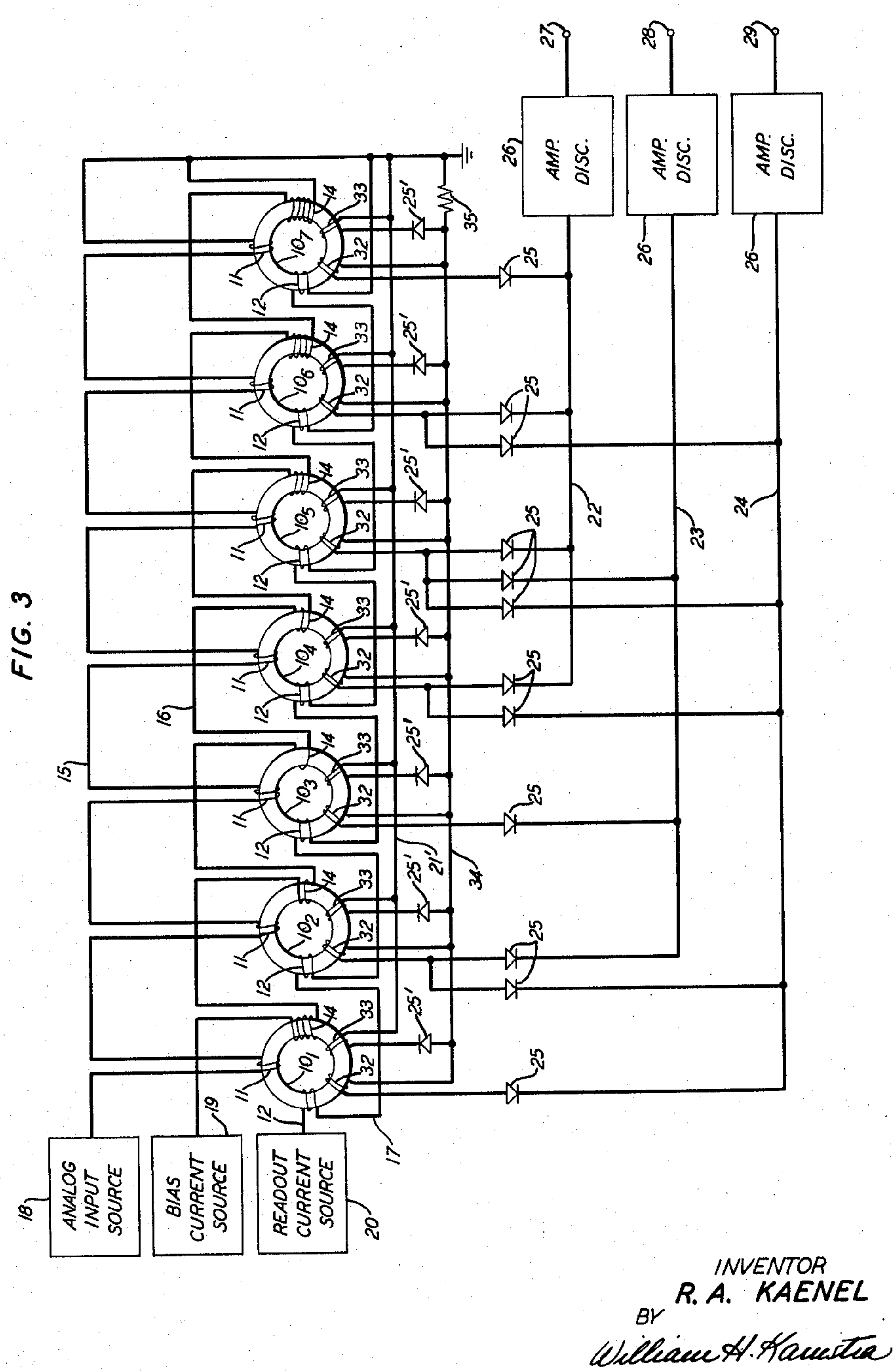
FIG. 3 is a schematic presentation of another illustrative conversion circuit according to the principles of the invention.

To insure a positive discrimination between the levels of the output signals generated by the cores 10 a modification within the scope of this invention may be made on the circuit of FIG. 1 to ease the burden on the amplitude discrimination circuits 26. Another illustrative embodiment of this invention incorporating such a modification is shown in FIG. 3. The conversion circuit there shown is similar to the circuit of FIG. 2 with the exception of the output winding arrangement of the cores. Accordingly, where the circuit elements and their connections are identical to those of the circuit of FIG. 1, the same reference characters are employed to designate these elements. A pair of output windings 32 and 33 are provided for each of the cores 10 of the circuit of FIG. 1 and are coupled thereto in opposing senses. One end of each of the windings 33 is connected to a ground bus 21' and the other end of each of the windings 33 is connected through a diode 25' to a biasing bus 34. One end of each of the output windings 32 is connected directly to the biasing bus 34 and the other end of each of the output windings 32 is connected to particular ones of the coding conductors 22, 23, and 24 through a diode 25 in a manner identical to that described in connection with the illustrative circuit of FIG. 1. The biasing bus 34 is connected at one end to ground through a biasing resistor 35.

Since the operation of the circuit of FIG. 3 is similar in every respect to that of the circuit of FIG. 1 except that of the generation of an output signal by the cores 10, only the latter aspect of an illustrative operation need be described to gain an understanding of this embodiment of the invention. In the operation of the embodiment of FIG. 1 it was assumed that a positive output signal was generated as a result of the application of the trailing edge of the readout pulse $i_r$. This is also the case in the present embodiment when such a positive signal is generated in the output winding 32 of a core 10. Since the companion output winding 33 is oppositely poled an output signal will also be generated therein but of opposite, negative polarity. By means of OR circuits represented by the diodes 25', biasing bus 34 may thus be biased to a negative potential which corresponds to the most positive output signals generated by the output windings 32. The signals generated in the output windings 32 and 33 may thus be made effectively to cancel. However, by adjusting the number of turns of the windings 32 and 33 such that the turns of the winding 32 exceed those of the windings 33 by a predetermined amount, the signal generated across the latter winding may be subtracted from the signal generated across the winding 32. Depending on the differential between the two output signals generated, only pulses of a predetermined magnitude will thus be transmitted to the coding conductors 22, 23, and 24. The threshold of the amplitude discrimination circuits 26 may then be set to only a slightly positive voltage value to achieve a positive discrimination between output signals. The output signals generated as a result of the negative going leading edge of a readout pulse $i_r$ may again be neglected in the circuit of FIG. 3. The diodes 25 and 25' will effectively block these signals from any part of the coding network.

Figure 4:
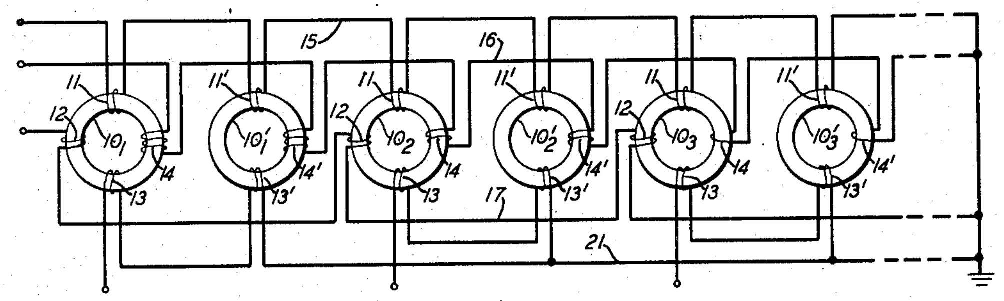
FIG. 4 is a partial schematic presentation of the conversion circuit of FIG. 1 modified to preclude the generation of spurious coded output signals.

Another illustrative embodiment of this invention is shown in part in FIG. 4. From the foregoing description of other specific embodiments it is apparent that transient peaks of the input current signal may conceivably cause a complete flux reversal in a core. Thus, depending on the particular bias of a core, a sudden peak in the opposite direction may in a case, cause a flux excursion to a condition of opposite saturation. As a result, a full-valued output signal is generated in the coupled output winding which signal would be instrumental in turn in generating spurious coded signals. To safeguard against such an eventuality the circuit of FIG. 4 is advantageously adapted to suppress any unwanted output signals produced by the cores 10. The circuit of FIG. 4 is shown only in sufficient detail to provide a complete understanding of the particular adaptation contemplated. In addition to the cores $10_1$ through $10_7$ previously described, a second plurality of cores $10_1'$ through $10_7'$ is provided, each of the cores 10 being paired with a core 10'. The cores 10' may also be formed of a magnetic material having substantially rectangular hysteresis characteristics. Each of the cores 10' has inductively coupled thereto an input winding 11', an output winding 13', and a bias winding 14'. The input windings 11' each are in the same sense and have the same number of turns as the input windings 11 coupled to the cores 10 and are also serially connected in the input circuit 15. A bias winding 14' of a core 10' is in the same sense and has the same number of turns as the bias winding 14 coupled to the companion core 10 of a core pair 10 and 10'. The bias windings 14' are also serially connected with the bias windings 14 in the biasing circuit 16. An output winding 13' coupled to a core 10' has the same number of turns but is coupled in an opposite sense to that of the output winding 13 coupled to the companion core 10 of a core pair. The windings 13 and 13' of each core pair are serially connected with one end of the winding 13' being connected to the ground bus 21 and one end of the winding 13 being connected to the coding conductors in the combinations previously described. The latter connections of only three of the core pairs are shown for simplicity merely as terminating in undesignated terminals in FIG. 4. The circuits 15, 16, and 17 also terminate in ground and are understood to be connected to the sources 18, 19, and 20, respectively.

It may be noted that the cores 10' have no readout windings coupled thereto and hence are not coupled in the readout circuit 17. The cores 10' thus, although being biased and driven in the same manner and to the same extent as the cores 10, produce no output signals during a readout time as a result of an applied readout pulse. During the normal readout when a core 10 may undergo a complete flux reversal and return to generate a maximum output signal in its output winding 13, the oppositely coupled series winding 13' merely comprises an inductance in the path of an output current induced by the voltage developed across the winding 13. A flux switching drive resulting from peaks in the input current heretofore mentioned, however, is applied to each core 10 and 10' of a core pair via the input windings 11 and 11' with which each of these cores is equipped. Since both of the cores 10 and 10' of a core pair are biased to the same extent and in the same direction any such unwanted flux reversal will be in the same direction in the two cores. However, since the windings 13 and 13' are coupled in series opposing any output signals occurring as the result of such sudden peaks in the input signal will be effectively cancelled. An effective counter to the generation of spurious coding signals is thus advantageously realized by adding an auxiliary core 10' and the described windings to each core 10 of a conversion circuit according to this invention.

The illustrative embodiments of this invention described in the foregoing thus lend themselves to numerous and various modifications therein, each of which is understood to fall within the principles and scope of this invention. Thus, the arrangement of FIG. 4 may be advantageously combined with the output winding arrangement shown in FIG. 3. Further, well-known multi-apertured magnetic structures may be employed in place of the toroidal elements assumed for purposes of description in the various embodiments described herein. Other arrangements may also be devised by one skilled in the art without departing from the spirit and scope of this invention.

What is claimed is:

1. An electrical circuit comprising a plurality of magnetic cores each having a substantially rectangular hysteresis characteristic loop, an input, a readout, an output, and a bias winding on each of said cores, an input circuit means for connecting each of said input windings in series, a readout circuit means for connecting each of said readout windings in series, a bias circuit means for connecting each of said bias windings in series, means for applying a current signal of a continuously varying amplitude to said input circuit means, means for applying biasing current to said bias circuit means, said biasing windings each being in a sense and having a number of turns such that each of said plurality of cores is magnetically biased to a different point on its hysteresis loop and is thereby driven to a different first flux excursion for instantaneous amplitudes of said current signal, means for applying periodic readout current pulses to said readout circuit means, said periodic readout current pulses being of an amplitude to cause periodic and equal second flux excursions in each of said cores, a coding network comprising a plurality of output conductors and connecting means for interconnecting said output windings to said output conductors in predetermined combinations, and amplitude discriminating means connected to each of said output conductors.

2. An electrical circuit according to claim 1 also comprising a unilateral conducting element connected to each of said output windings and its connected output conductors.

3. An electrical conversion circuit comprising a plurality of magnetic elements each having a substantially rectangular hysteresis characteristic loop, a bias winding of a different turns-sense combination on each of said elements, means for simultaneously applying a bias current to each of said bias windings to magnetically bias each of said elements to a different point on its hysteresis loop, means responsive to an input signal for further driving each of said elements an equal amount in one direction on its hysteresis loop, means for subsequently driving each of said elements an equal amount in a direction on its hysteresis loop opposite to that of said bias current, an output winding on each of said elements energized responsive to said last-mentioned drive for generating output signals of a magnitude corresponding to the extent of said last-mentioned drive in the associated element, a plurality of coding conductors connected to said output windings in particular combinations, and discrimination means connected to each of said coding conductors for discriminating output signals of a particular magnitude.

4. An electrical circuit comprising a sequence of magnetic elements each having a similar substantially rectangular BH loop, means for progressively magnetically biasing said elements in equal increments along the H axis of said loop, an input circuit including an input winding on each of said elements, means for applying an input signal to said input circuit to drive each of said elements an equal amount in the same direction from its biasing point, a readout circuit including a readout winding on each of said elements, means for applying a readout pulse to said readout circuit to drive each of said elements an equal amount in the direction opposite to that of said bias current, and first output windings on said elements energized responsive to said last-mentioned drive for generating first output signals corresponding in magnitude to the amount of said last-mentioned drive.

5. An electrical circuit according to claim 4 also comprising second output windings on said elements having a number of turns and being in a sense different from the number of turns and the sense of said first output windings, said second output windings energized responsive to said last-mentioned drive for generating second output signals in the opposite polarity, and means for adding said first output signals and said second output signals comprising a biasing bus connected directly to said first output windings and connected to each of said second output windings through a biasing diode means.

6. An electrical circuit according to claim 5 also comprising a plurality of coding conductors and means including unidirectional current elements for connecting said coding conductors to said first output windings in predetermined combinations.

7. An electrical circuit according to claim 6 in which said equal increments and the amount of said drive are adjusted so that a complete traversal from one remanent point to the opposite remanent point on its hysteresis loop is caused in one of said elements.

8. An electrical conversion circuit comprising a plurality of magnetic elements each having a substantially rectangular hysteresis loop, an input, a bias, a readout, and a first and second output winding on each of said elements, an input circuit for connecting each of said input windings in series, a bias circuit for connecting each of said bias windings in series, a readout circuit for connecting each of said readout windings in series, means for applying input signals of varying amplitude to said input circuit, means for applying a continuous biasing current to said bias circuit, each of said bias windings having a different turns-sense combination such that each of said elements is magnetically biased to a different point on its hysteresis loop responsive to said biasing current, means for periodically applying a readout pulse to said readout circuit, a biasing bus connected directly to each of said first output windings and connected to each of said second output windings through a diode means, said first output windings having a different number of turns and being in a sense opposite from that of said second output windings such that signals induced in each of said first and second output windings are additive to produce a resultant signal, a plurality of coding conductors, and means for applying said resultant signals from each of said first output windings to said coding conductors in predetermined combinations.

9. An electrical conversion circuit comprising a plurality of first magnetic elements, a plurality of second magnetic elements associated respectively with said plurality of first magnetic elements, each of said elements having substantially rectangular hysteresis characteristics, an input and a bias winding on each of said first and second elements, the bias windings of said first elements having different turns-sense combinations and the bias winding on a first element having the same number of turns and being in the same sense as the bias winding on the associated second element, a readout winding on each of said first elements, an output winding on each of said first and second elements, the output winding on a first element having a different number of turns and in being in a sense opposite to that of the output winding of the associated second element, input circuit means for connecting each of said input windings in series, bias circuit means for connecting each of said bias windings in series, readout circuit means for connecting each of said readout windings in series, output circuit means for connecting the output winding of each of said first elements in series with the output winding of its associated second element, means for applying input signals to said input circuit, means for applying a biasing current to said biasing circuit, and means for applying periodic readout pulses to said readout circuit.

10. An electrical conversion circuit according to claim 9 also comprising a coding network comprising a plurality of output conductors, means including diode means for connecting said output conductors to said output circuit means in predetermined combinations, and an amplitude discriminating means connected to each of said output conductors.

11. An electrical circuit comprising a plurality of magnetic cores each having a substantially rectangular hysteresis loop, means for biasing each of said cores to a different point on its hysteresis loop, means including an input winding for applying an equal input drive to each of said cores, means including a readout winding for applying an equal readout drive to each of said cores, output windings on said cores energized responsive to particular flux excursions in said cores for generating output signals of different amplitudes as determined by said particular flux excursions, a plurality of amplitude discriminating means energized responsive to signals of a particular amplitude for generating coded signals, and means for applying said output signals to said amplitude discriminating means in predetermined combinations.

References Cited in the file of this patent

UNITED STATES PATENTS

| | | |
|---|---|---|
| 2,696,347 | Lo | Dec. 7, 1954 |
| 2,719,773 | Karnaugh | Oct. 4, 1955 |
| 2,762,935 | Chow | Sept. 11, 1956 |
| 2,947,971 | Glauberman | Aug. 2, 1960 |
| 2,962,704 | Buser | Nov. 29, 1960 |